(12) United States Patent
Aoki

(10) Patent No.: US 11,052,876 B2
(45) Date of Patent: Jul. 6, 2021

(54) WIPER ARM

(71) Applicant: Nippon Wiper Blade Co., Ltd., Kazo (JP)

(72) Inventor: Yoshiaki Aoki, Kazo Saitama (JP)

(73) Assignee: DENSO WIPER SYSTEMS, INC., Shizuoka (JP)

(*) Notice: Subject to any disclaimer, the term of this patent is extended or adjusted under 35 U.S.C. 154(b) by 267 days.

(21) Appl. No.: 16/313,635

(22) PCT Filed: Jun. 27, 2017

(86) PCT No.: PCT/JP2017/023531
§ 371 (c)(1),
(2) Date: Dec. 27, 2018

(87) PCT Pub. No.: WO2018/003782
PCT Pub. Date: Jan. 4, 2018

(65) Prior Publication Data
US 2019/0168715 A1    Jun. 6, 2019

(30) Foreign Application Priority Data

Jun. 27, 2016    (JP) .............................. JP2016-127088

(51) Int. Cl.
*B60S 1/34*    (2006.01)
(52) U.S. Cl.
CPC .............. *B60S 1/3465* (2013.01); *B60S 1/34* (2013.01); *B60S 1/3431* (2013.01); *B60S 1/3459* (2013.01)
(58) Field of Classification Search
CPC ............ B60S 1/34; B60S 1/32; B60S 1/3456
See application file for complete search history.

(56) References Cited

U.S. PATENT DOCUMENTS 2,782,450 A * 2/1957 Nesson ................. B60S 1/3468
15/250.202
2,799,039 A * 7/1957 Oishei ....................... B60S 1/34
15/250.202
(Continued)

FOREIGN PATENT DOCUMENTS

DE        1078461 B1    3/1960
GB        2 149 651 A    6/1985
WO    WO-2014115820 A1 *  7/2014    ............ B60S 1/3456

OTHER PUBLICATIONS

Extended Search Report issued in corresponding EP application No. 17 82 0136 with a date of completion of Jan. 13, 2020.

*Primary Examiner* — Michael D Jennings
(74) *Attorney, Agent, or Firm* — Muncy, Geissler, Olds & Lowe, P.C.

(57) ABSTRACT

A wiper arm includes a spring for applying a biasing force to the rotation of an arm main body with respect to an arm head and enables the thickness of the wiper arm to be thinner while ensuring the suitable biasing force. The wiper arm also includes a coil spring and a spring plate. The arm main body includes a hinge block rotatably connected to the arm head through a hinge pin and a shaft section extending from the hinge block. The spring plate includes a front end wall including an insertion hole into which the shaft section is inserted and leg sections rotatably attached to the arm head through a roller pin. The coil spring is disposed to be coaxial with the shaft section and is held to be sandwiched between the front end surface of the hinge block and the front end wall of the spring plate.

5 Claims, 9 Drawing Sheets

(56) References Cited

U.S. PATENT DOCUMENTS

| | | | |
|---|---|---|---|
| 2,979,352 A * | 4/1961 | Anderson | B60S 1/3459 403/75 |
| 3,176,336 A | 4/1965 | Scinta | |
| 5,634,235 A * | 6/1997 | Hultquist | B60S 1/34 15/250.34 |
| 2008/0052866 A1 * | 3/2008 | Matsumoto | B60S 1/3468 15/250.351 |

* cited by examiner

WIPER ARM

TECHNICAL FIELD

The present invention relates to a wiper arm including biasing means for applying a suitable biasing force to the rotation of an arm main body with respect to an arm head.

BACKGROUND ART

A wiper device generally includes a wiper blade for wiping a surface to be wiped such as a glass surface of a vehicle, a wiper arm for supporting the wiper blade, and driving means (a drive motor) for driving the wiper arm. The wiper arm includes an arm head linked to the driving means and an arm main body rotatably connected to the arm head so that the arm main body supports the wiper arm.

FIG. 9 is a sectional view illustrating a part of such a conventional wiper arm. As illustrated in the figure, a wiper arm 101 includes an arm head 102 and a retainer 104 rotatably connected to the arm head 102 through a pivot shaft 103. The retainer 104 is a member which constitutes a part of an arm main body, and has a U-shaped cross section formed by a top wall 104A and side walls 104B disposed on both sides of the top wall 104A.

A spring 105 is an extension spring and is provided within the retainer 104 (within the space defined by the top wall 104A and the side walls 104B). The spring 105 includes a distal end locking section 105A which is attached to the retainer 104 through a fixing rivet 106. The spring 105 also includes a proximal end locking section 105B which is attached to the arm head 102 through a hook member 107 and a fixing pin 108.

With this construction, the spring 105 functions to apply a suitable biasing force to a rotational movement of the retainer 104 with respect to the arm head 102. Specifically, as illustrated in FIG. 9, when the wiper arm 101 is in a normal use state where the retainer 104 is disposed to extend approximately straight from the arm head 102, the spring 105 applies a force so as to cause the retainer 104 to rotate in the clockwise rotation direction in the figure. A wiper blade (not illustrated) supported by the arm main body is thereby pressed against the surface to be wiped (not illustrated) with an appropriate pressing force. On the other hand, when the wiper arm 101 is rotated in the counterclockwise rotation direction in the figure to a locked-back state where the retainer 104 is upright with respect to the arm head 102, the spring 105 urges the retainer 104 in the counterclockwise rotation direction in the figure so that the retainer 104 is held in such an upright state.

CITATION LIST

Patent Literature

Patent Literature 1: Japanese Patent No. 5601733

SUMMARY OF INVENTION

Technical Problem

As described above, the spring 105 in the wiper arm 101 generates a moment for rotating the arm head 102 and the retainer 104 about the pivot shaft 103. To generate a sufficiently large moment between the arm head 102 and the retainer 104, the direction of a force W applied from the spring 105 must be directed at a certain degree of angle α with respect to the direction of a line segment L connecting the rotation center of the arm head 102 (the center of the pivot shaft 103) and the point of application of the force of the spring 105 (the center of the fixing pin 108). Accordingly, the fixing pin 108 must be disposed on the lower side of the pivot shaft 103 (the side to which the retainer 104 is rotated). Accordingly, the entire of the spring 105 cannot be disposed within the interior of the retainer 104 so that the hook member 107 (or a hook portion integrated with an end of the spring 105) is disposed to protrude from the lower side of the retainer 104. This prevents the wiper arm 101 from being thinner.

The present invention has been made in view of the foregoing problems, and it is an object of the present invention to provide a wiper arm which is provided with biasing means for applying a suitable biasing force to the rotation of an arm main body with respect to an arm head and enables the thickness of the wiper arm to be thinner while ensuring the suitable biasing force.

Solution to Problem

The present invention provides a wiper arm including an arm head, an arm main body rotatably connected to the arm head through a hinge pin, biasing means for generating a biasing force to the rotation of the arm main body with respect to the arm head, and a link member rotatably attached to the arm head, wherein the arm main body includes an arm main body side spring seat, the link member includes a link member side spring seat disposed opposite to the hinge pin with respect to the arm main body side spring seat, and the biasing means is sandwiched between the arm main body side spring seat and the link member side spring seat.

The biasing means may be a push spring.

The arm main body may include a hinge block which is a block member rotatably attached to the arm head, and the arm main body side spring seat may be provided to the hinge block.

The arm main body may include a shaft section extending from the hinge block, and the biasing means may be a coil spring which is disposed to be coaxial with the shaft section.

The link member side spring seat may include a through-hole into which the shaft section is inserted and may be disposed on the shaft section.

The hinge block may include a hinge pin hole to which the hinge pin is attached, serration may be formed on an outer circumferential surface of the hinge pin, and the serration may bite into an inner circumferential surface of the hinge pin hole to fix the hinge pin to the hinge pin hole.

Advantageous Effects of Invention

According to the present invention, the link member (for example, spring plate 5) which is rotatably attached to the arm head (for example, arm head 2) is provided to the wiper arm (for example, wiper arm 1), while the biasing means (for example, coil spring 4) for applying a biasing force to the rotation of the arm main body (for example, arm main body 3) with respect to the arm head is sandwiched between the arm main body side spring seat (for example, front end surface 21c of hinge block 21) provided to the arm main body and the link member side spring seat (for example, front end wall 31) disposed opposite to the hinge pin (for example, hinge pin 15) with respect to the arm main body side spring seat. As a result, the entire biasing means can be disposed in front of the hinge pin. Accordingly, the biasing means do not need to be provided with a protruding portion (a hook portion) to bypass the hinge pin downwardly, and therefore the wiper arm can be formed to be thinner.

The arm main body includes a hinge block (for example, a hinge block 21) which is a block member rotatably attached to the arm head, and the arm main body side spring seat is provided to the hinge block so that a support structure on the proximal side (hinge pin side) of the biasing means can be simply configured with a small number of components.

The biasing means is a coil spring and is disposed (around the shaft section) to be coaxial with the shaft section (for example, shaft section 22) extending from the hinge block so that a portion of the biasing means protruding to the periphery can be minimized, and therefore the wiper arm can be configured to be compact.

The link member side spring seat (front end wall 31 of spring plate 5) includes a through-hole (for example, insertion hole 33) into which the shaft section is inserted, and the link member side spring seat is disposed on the shaft section. Accordingly, the spring seat for the biasing means disposed to be coaxial with the shaft section can be appropriately configured, and therefore the force from the biasing means can appropriately act on the arm main body.

Serration is provided around the hinge pin and bites into the inner circumferential surface of the hinge pin hole (for example, hinge pin hole 24) of the hinge block so that the hinge pin is fixed to the hinge pin hole. This enables the hinge block to be connected to the arm head quite easily.

DESCRIPTION OF EMBODIMENTS

Hereinafter, one embodiment of the present invention will be described based on the accompanying drawings.

Figure 1:
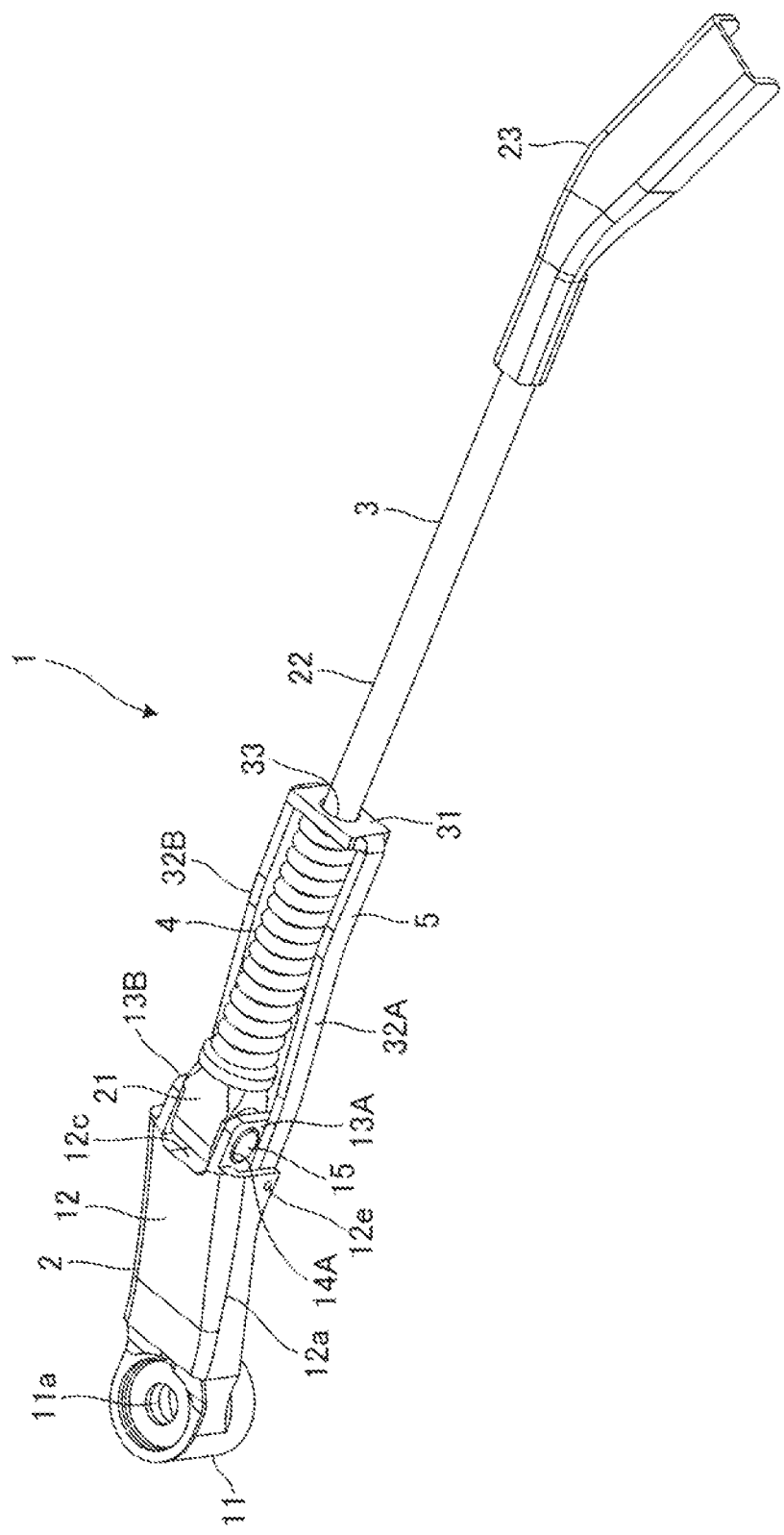
FIG. 1 is a perspective view illustrating a wiper arm according to one embodiment of the present invention.
Figure 2:
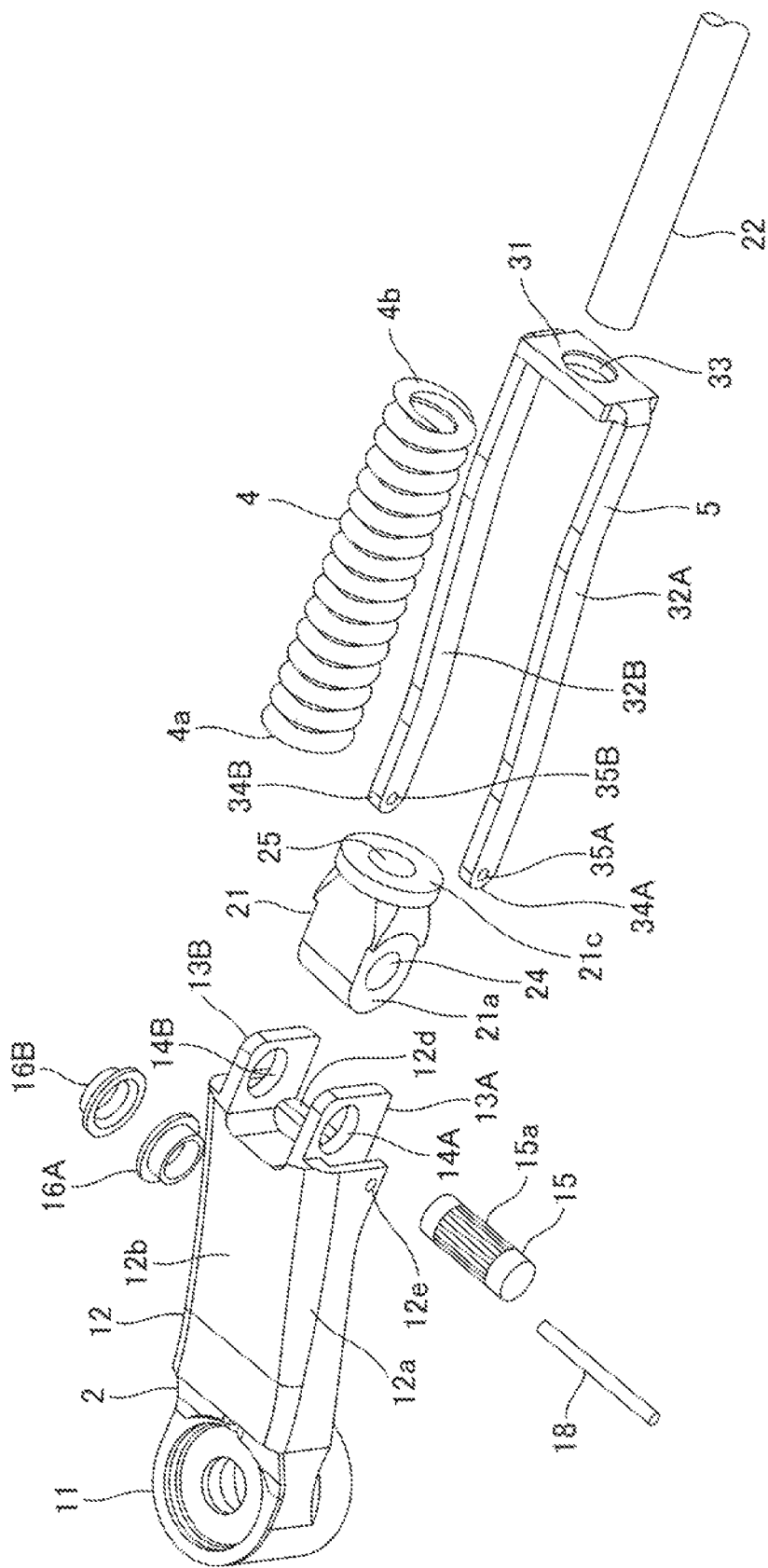
FIG. 2 is a exploded perspective view illustrating a part of the wiper arm.

FIG. 1 and FIG. 2 illustrate an overall structure of a wiper arm 1 of the present invention. As illustrated in the figures, the wiper arm 1 includes an arm head 2 which constitutes a proximal end section of the wiper arm 1, an arm main body 3 rotatably connected to the arm head 2, a coil spring 4 which is a push spring, and a spring plate 5 which is a link member for generating a spring force of the coil spring 4 acting between the arm head 2 and the arm main body 3. A cover member for covering a part of or the entire wiper arm 1 may be provided to the arm head 2 side and the arm main body 3 side of the wiper arm 1, if necessary.

Figure 3:
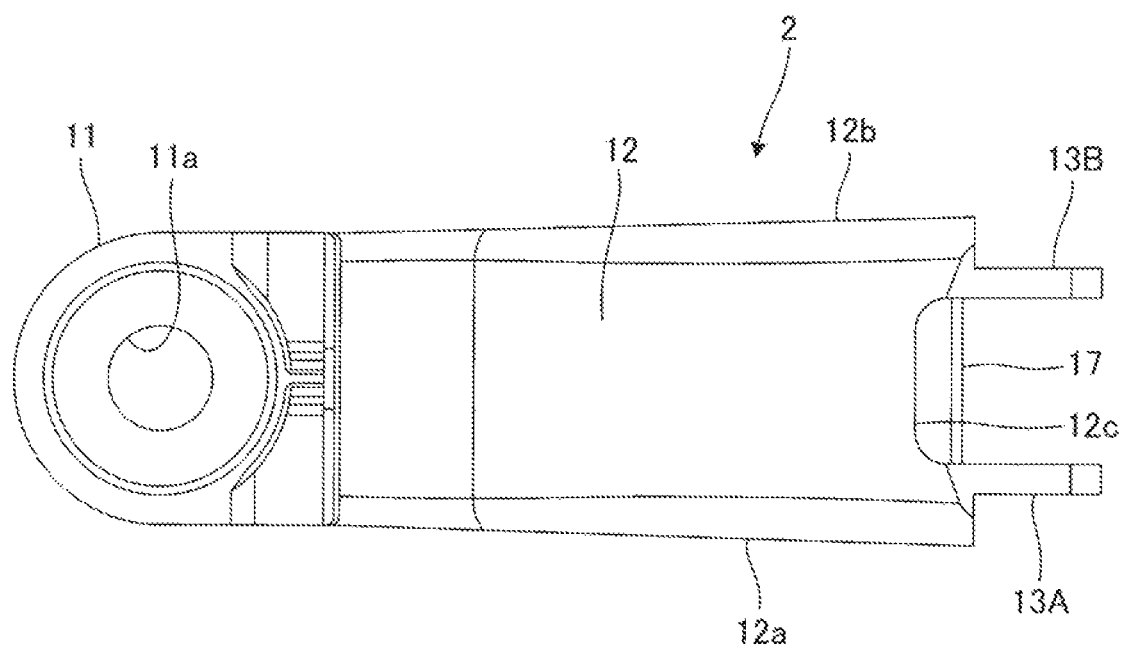
FIG. 3 is a plan view illustrating an arm head.
Figure 4:
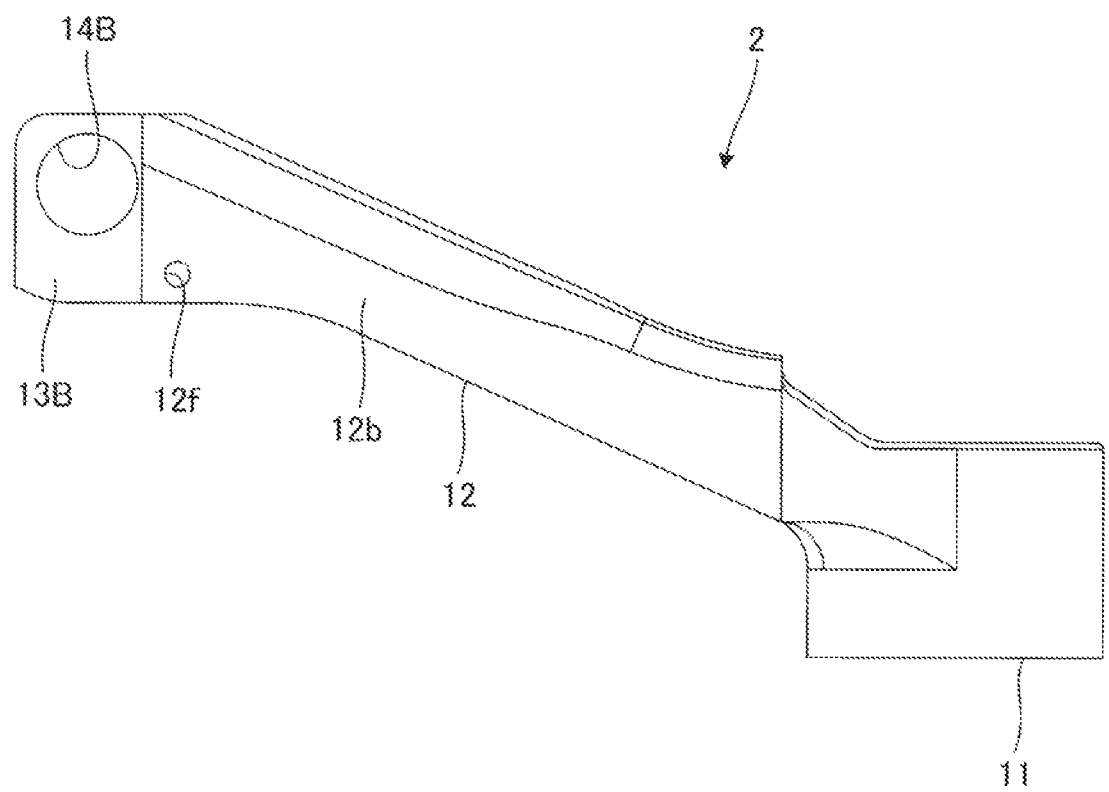
FIG. 4 is a side view illustrating the arm head.
Figure 5:
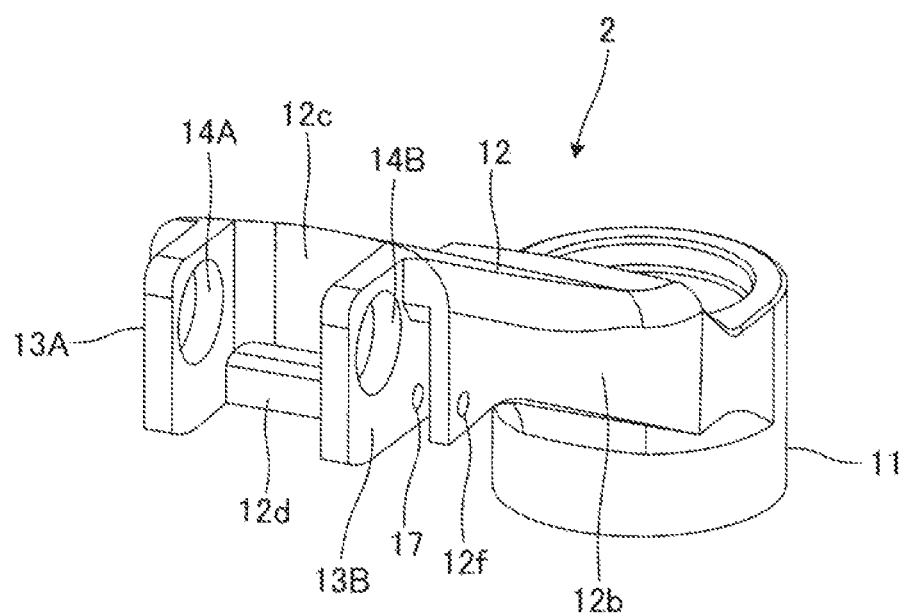
FIG. 5 is a perspective view illustrating the arm head.

As illustrated in FIG. 3 to FIG. 5, the arm head 2 includes a base section 11 having a substantially cylindrical shape, a main body section 12 extending forward from the base section 11, and a pair of left and right plate-like arm sections 13A, 13B. A drive shaft hole 11a is formed in the base section 11 to penetrate the base section 11 in an up-down direction. The arm head 2 is linked with driving means (not illustrated) through a drive shaft (not illustrated) attached to the drive shaft hole 11a.

Figure 8:
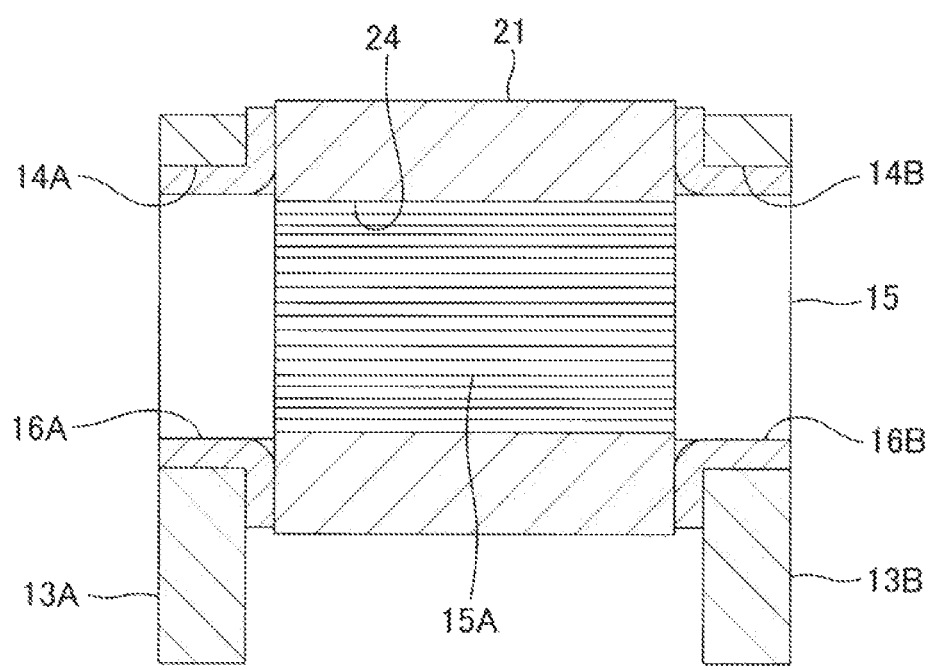
FIG. 8 is a cross-sectional view illustrating a connecting portion of the arm head and the arm main body.
Figure 9:
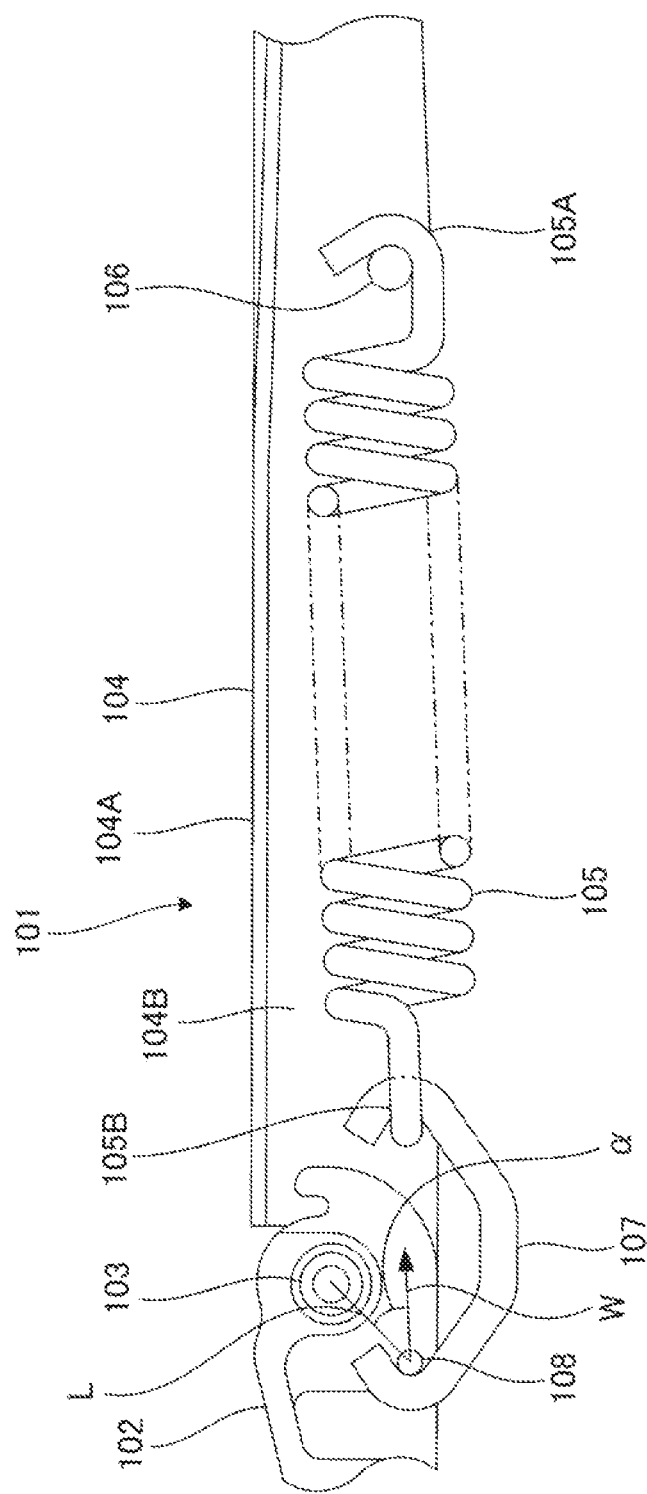
FIG. 9 is a cross-sectional view illustrating a part of a conventional wiper arm.

The arm sections 13A, 13B extend forward from portions slightly inside of left and right side walls 12a 12b on a front end surface 12c to be in substantially parallel with the side walls 12a, 12b, respectively. The arm sections 13A, 13B are disposed at a predetermined interval so as to sandwich a proximal end section (a hinge block 21 described later) of the arm main body 2 therebetween and support the proximal end section. Connecting shaft holes 14A, 14B are formed in the arm sections 13A, 13B to penetrate the arm sections 13A, 13B, respectively. The arm main body 3 (the hinge block 21) is rotatably connected to the arm head 2 through a hinge pin 15 disposed in the connecting shaft holes 14A, 14B. Bearings 16A, 16B are provided to the connecting shaft holes 14A, 14B, respectively (see FIG. 2 and FIG. 8).

A protruding section 12d which protrudes from the front end surface 12c of the main body section 12 is provided between the arm sections 13A, 13B. A roller pin hole 17 is formed in the protruding section 12d and the arm sections 13A, 13B disposed on both sides of the protruding section 12d to penetrate the protruding section 12d and the arm sections 13A, 13B in the transverse direction so that a roller pin 18 is inserted into and fixed to the roller pin hole 17. Roller pin holes 12e, 12f are formed at positions corresponding to the roller pin hole 17 in the side walls 12a, 12b disposed on both sides of the main body section, respectively, so that both side end portions of the roller pin 18 are fixed to the pin holes 12e, 12f, respectively. As described later in detail, the spring plate 5 is rotatably connected to the arm head 2 through this roller pin 18.

The roller pin hole 17 is provided at a position deviated rearward and downward from the connecting shaft holes 14A, 14B so that a rotation center axis (the roller pin 18) of the spring plate 5 is disposed at a position deviated from a rotation center axis (hinge pin 15) of the arm main body 3. As described later in detail, with this construction, the spring force of the coil spring 4 appropriately acts on the rotation of the arm main body 3.

As illustrated in FIG. 1 and FIG. 2, the arm main body 3 includes a hinge block 21 disposed at the proximal end of the arm main body 3, a shaft section 22 having a cylindrical rod shape which extends from the hinge block 21, and a connecting section 23 provided at the distal end of the shaft section 22. A wiper blade (not illustrated) is attached to the connecting section 23 so that the wiper arm 2 is connected to the wiper blade.

Figure 6:
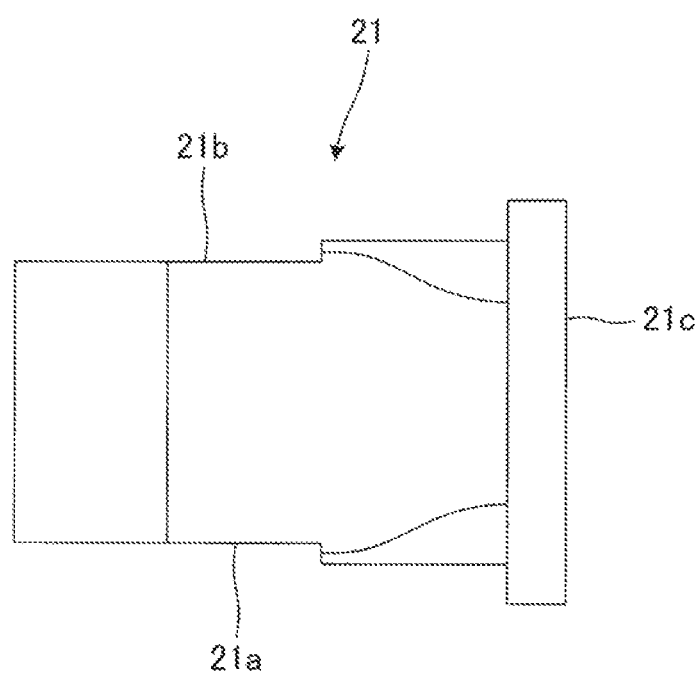
FIG. 6 is a plan view illustrating a hinge block.
Figure 7:
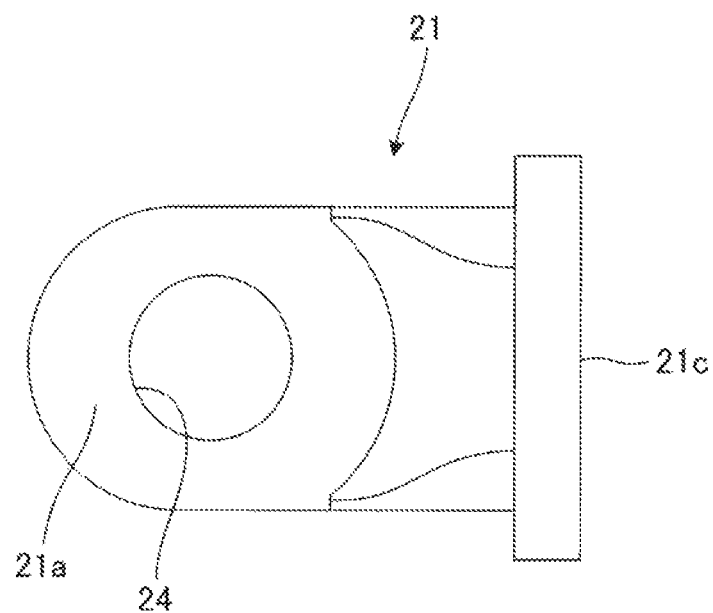
FIG. 7 is a side view illustrating the hinge block.

As illustrated in FIG. 6 and FIG. 7, the hinge block 21 is a block member having width and height larger than those of the shaft section 22. A hinge pin hole 24 is formed in the hinge block 21 to penetrate the hinge block 21 in the transverse direction, and is opened between left and right side surfaces 21a, 21b of the hinge block 21 (see FIG. 8). A fixing hole 25 is formed in a flat front end surface 21c of the hinge block 21 and is opened toward the front side so that the shaft section 22 is fixed to the fixing hole 25.

As illustrated in FIG. 7, the hinge block 21 is disposed between the arm sections 13A, 13B on both sides of the arm head 2 and is rotatably connected to the arm sections 13A, 13B through the hinge pin 15 which is provided so as to extend through the connecting shaft holes 14A, 14B (the bearings 16A, 16B) of the arm sections 13A, 13B and the hinge pin hole 24 of the hinge block 21.

Serration 15a (a plurality of uneven shaped portions having a triangular cross section and extending around the entire outer circumference) extending in the axial direction is formed on the outer circumferential surface of a middle portion of the hinge pin 15. Accordingly, when the hinge pin 15 is press-fitted into the hinge pin hole 24, the serration 15a on the hinge pin 15 bites into the inner circumferential surface of the hinge pin hole 24 to fix the hinge pin 15 to the hinge pin hole 24. Side end portions 15b, 15c on both sides of the hinge pin 15 are rotatably supported in the bearings 16A, 16B, respectively. Accordingly, the arm main body 3 is rotatably connected to the arm head 2.

The spring plate 5 includes a front end wall 31 which is a plate-like spring receiving section and lever-shaped leg sections 32A, 32B which extend rearward from the left and right sides of the front end wall 31. A circular insertion hole 33 having a diameter slightly larger than that of the shaft section 22 of the arm main body 3 is formed in the front end wall 31 to penetrate the front end wall 31 so that the shaft section 22 is slidably inserted into this insertion hole 33.

The leg sections 32A, 32B of the spring plate 5 extend rearward along the left and right sides of the shaft section 22 of the arm main body 3, respectively, while rear end portions 34A, 34B of the leg sections 32A, 32B extend to a space between the side walls 12a, 12b on both sides of the main body section 12 of the arm head 2 and the arm sections 13A, 13B on both sides of the arm head 2 (lateral sides of the roller pin holes 17, 12e, 12f of the arm head 2).

Roller pin shaft holes 35A, 35B are formed near the rear end portions 34A, 34B of the respective leg sections 32A, 32B. The roller pin 18 fixed to the roller pin hole 17 of the arm head 2 is rotatably inserted into these roller pin shaft holes 35A, 35B. Accordingly, the rear end portions 34A, 34B of the spring plate 5 are connected to the arm head 2 to be rotatable about the roller pin 18.

The coil spring 4 is disposed around (coaxial with) the shaft section 22 of the arm main body 22. A rear end portion 4a of the coil spring 4 is in contact with the front end surface 21c of the hinge block 21, while a front end portion 4b of the coil spring is in contact with the front end wall 31 of the spring plate 5. Accordingly, the coil spring 4 is held to be sandwiched between the front end surface 21c of the hinge block 21 and the front end wall 31 of the spring plate 5 in a compressed state. Therefore, the front end surface 21c of the hinge block 21 and the front end wall 31 of the spring plate 5 function as rear and front spring seats of the coil spring 4, respectively.

With this construction, the coil spring 4 functions to apply a suitable biasing force to the rotation of the arm main body 3 with respect to the arm head 2. Specifically, the spring plate 5 rotates about the rotation center axis (the center axis of the roller pin 18) which is disposed at a position deviated from the rotation center axis (the center axis of the hinge pin 15) of the arm main body 3. Accordingly, when the spring plate 5 rotates about the hinge pin 15 of the arm main body 3, the front end wall 31 of the spring plate 5 changes the position on the shaft section 22. In contrast, when the position of the front end wall 31 on the shaft section 22 is changed, the arm main body 3 which is engaged with the front end wall 31 in the insertion hole 33 is moved in the rotation direction corresponding to the direction of the movement of the front end wall 31.

On the other hand, since the coil spring 4 is a push spring interposed between the hinge block 21 and the front end wall 31 of the spring plate 5, the spring force acts on the front end wall 31 to push forward (toward the connecting section 23 side) along the shaft section 22 of the arm main body 3. As a result, the front end wall 31 is urged to move forward on the shaft section 22, and therefore the spring force from the coil spring 4 acts on the arm main body 3 in the rotation direction corresponding to the forward movement of the front end wall 31.

The positional relationship between the rotation center axis of the arm main body 3 and the rotation center axis of the spring plate 5 is adjusted so that the sufficient spring force acts in the rotation direction according to whether the wiper arm 1 is in a normal use state as illustrated in FIG. 1 (a state where the arm main body 3 extends straight from the arm head 2) or in a locked-back state (a state where the arm head main body 3 is rotated in a direction substantially perpendicular to the arm head 2 to be upright). Specifically, when the wiper arm 1 is in the normal use state, the spring force of the coil spring 4 acts in the rotation direction in which the wiper blade supported by the wiper arm 1 is pressed against a surface to be wiped. On the other hand, when the wiper arm 1 is in the locked-back state, the spring force of the coil spring 4 acts to hold the arm main body 3 in the upright state.

As described above, the wiper arm 1 of the present embodiment includes the hinge block 21 provided on the proximal end side of the arm main body 3 and the spring plate 5 rotatably connected to the arm head 2 so as to have a rotation center at a position deviated from the rotation center of the arm main body 3 so that the coil spring 4 for applying a suitable biasing force to the rotation of the arm main body 3 is sandwiched between the front end wall 31 of the spring plate 5 and the hinge block 21. Since the leg sections 32A, 32B of the spring plate 5 are disposed outside (on the lateral sides) of the arm sections 13A, 13B of the arm head 2 and the hinge pin 15 and reach the rear side of the hinge pin 15 to be connected to the arm head 2, the force of the entire coil spring 4 disposed forward of the hinge pin 15 sufficiently acts between the arm head 2 and the arm main body 3 through the spring plate 5. Accordingly, there is no need to provide the coil spring 4 with a protruded portion (a hook portion) for bypassing the hinge pin 15 downwardly. Therefore, the wiper arm 1 can be formed to have a thin thickness.

Since the hinge block 21 which is a block member is sandwiched between the arm sections 13A, 13B of the arm head 2 and is supported by the arm sections 13A, 13B, the hinge block 21 can be attached to the arm head 2 only by inserting the hinge pin 15 through the hinge pin hole 24 of the hinge block 21 and the connecting shaft holes 14A, 14B of the arm sections 13A, 13B and fixing the hinge pin 15 in the hinge pin hole 24 through the serration 15a formed on the outer circumferential surface of the hinge pin 15. Accordingly, works such as caulking the hinge pin for connecting the arm main body 3 to the arm head 2 is unnecessary. Therefore, the installation of the arm main body 3 to the arm head 2 can be quite easily carried out.

Since the coil spring 4 is disposed to be coaxial with the arm main body, the entire wiper arm 2 can be configured to be very small in size.

In the foregoing embodiment, the coil spring 4 is disposed to be coaxial with the arm main body 3, but the present invention is not limited to such a configuration. For example, the coil spring 4 can be disposed adjacent to the arm main body 3.

In the foregoing embodiment, the leg sections 32A, 32B of the spring plate 5 are disposed outside (the lateral sides) of the arm sections 13A, 13B of the arm head 2 and the hinge pin 15, but the present invention is not limited to such a configuration. For example, the leg sections of the spring plate 5 can extend to the rear side of the hinge pin 15 through the hinge block 21 and the hinge pin 15.

LIST OF REFERENCE NUMERALS

1 Wiper arm
2 Arm head
3 Arm main body
4 Coil spring
4a Rear end portion of coil spring
4b Front end portion of coil spring
5 Spring plate
11 Base section of arm head
11a Drive shaft hole
12 Main body section of arm head
12a, 12b Side wall of main body section
12c Front end surface of main body section
12d Protruding section of main body section
12e, 12f Roller pin hole
13A, 13B Arm section of arm head
14A, 14B Connecting shaft hole
15 Hinge pin
15a Serration
16A, 16B Bearing
17 Roller pin hole
18 Roller pin
21 Hinge block of arm main body
21a, 21b Side surface of hinge block
21c Front end surface of hinge block
22 Shaft section of arm main body
23 Connecting section of arm main body
24 Hinge pin hole
25 Fixing hole
31 Front end wall of spring plate
32A, 32B Leg section of spring plate
31 Insertion hole
34A, 34B Rear end portion of leg section
35A, 35B Roller pin shaft hole

The invention claimed is:

1. A wiper arm comprising:
an arm head;
an arm main body rotatably connected to the arm head through a hinge pin;
a spring for generating a biasing force to the rotation of the arm main body with respect to the arm head; and
a link member rotatably attached to the arm head,
the arm main body including an arm main body side spring seat,
the link member including a link member side spring seat disposed opposite to the hinge pin with respect to the arm main body side spring seat,
the spring being sandwiched between the arm main body side spring seat and the link member side spring seat,
wherein the arm main body includes a hinge block which is a block member rotatably attached to the arm head, and wherein the arm main body side spring seat is provided to the hinge block.

2. The wiper arm according to claim 1, wherein the spring is a push spring.

3. The wiper arm according to claim 1, wherein the arm main body includes a shaft section extending from the hinge block, and
wherein the spring is a coil spring which is disposed to be coaxial with the shaft section.

4. The wiper arm according to claim 3, wherein the link member side spring seat includes a through-hole into which the shaft section is inserted and is disposed on the shaft section.

5. The wiper arm according to any one of claim 1, wherein the hinge block includes a hinge pin hole to which the hinge pin is attached,
wherein serration is formed on an outer circumferential surface of the hinge pin, and
wherein the serration bites into an inner circumferential surface of the hinge pin hole so as to fix the hinge pin to the hinge pin hole.

* * * * *